No. 861,216. PATENTED JULY 23, 1907.
A. R. & W. F. KEEHL.
NUT LOCK.
APPLICATION FILED FEB. 23, 1906.

Witnesses:
A. L. Lord
B. W. Reid

Inventors.
August R. Keehl and
William F. Keehl
By Fouts & Hull.
Attorneys

UNITED STATES PATENT OFFICE.

AUGUST R. KEEHL AND WILLIAM F. KEEHL, OF CLEVELAND, OHIO.

NUT-LOCK.

No. 861,216.

Specification of Letters Patent.

Patented July 23, 1907.

Application filed February 23, 1906. Serial No. 302,344.

*To all whom it may concern:*

Be it known that we, AUGUST R. KEEHL and WILLIAM F. KEEHL, residing at Cleveland, in the county of Cuyahoga and State of Ohio, have invented a certain new and useful Improvement in Nut-Locks, of which the following is a full, clear, and exact description, reference being had to the accompanying drawings.

Our invention relates to nut locks, and has for its object to provide a nut with simple, effective, and inex10 pensive means whereby the unscrewing of the same is prevented, without liability of the locking means to become displaced and without weakening the nut.

Generally speaking, the invention may be defined as consisting of the combinations of elements, for the purposes specified, embodied in the claims hereto annexed.

Figure 1:
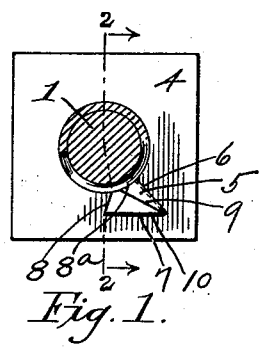
Figure 2:
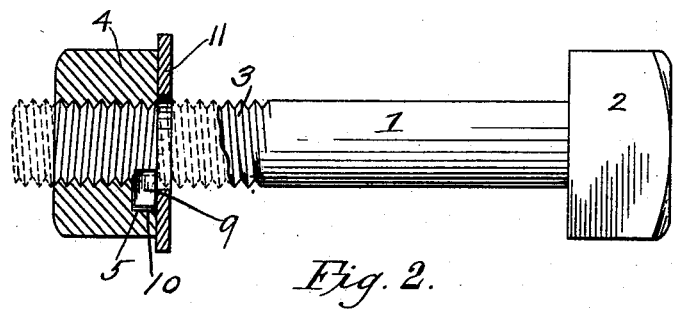

Referring to the drawings:—Figure 1 represents a plan view of the inner face of a nut having our invention applied thereto, the bolt being represented in sec20 tion; and Fig. 2 represents a sectional view on the line 2—2 of Fig. 1, part of the bolt being shown in elevation.

1 represents a bolt of ordinary construction having the head 2 and the threaded end 3.

4 represents a nut, also of ordinary construction, adapted to be threaded onto said bolt. This nut is provided within its inner face, with a recess 5, said recess being located adjacent the bore of the nut and being preferably quadrangular in shape. One wall 6 of said recess extends radially of the nut in the direction of a line joining diametrically opposite corners of the nut. The wall 7, adjacent said wall 6, forms an acute angle therewith, and the wall 8 of said recess preferably forms an acute angle with said wall 7, for the purpose of retaining in said recess the form of nut lock which we employ. The recess 5 merges with the bore of the nut, an opening or mouth $8^a$ being provided between said recess and bore.

Within the recess 5 is placed the nut lock, said lock consisting of an angular spring, one leg 9 of which ex40 tends in the direction of the wall 6 and in substantial contact therewith before the nut is applied to a bolt. The other leg 10 of said spring extends along the wall 7 and is in substantial contact therewith. The leg 9 projects within the bore of the nut to a point corre45 sponding to the inner surface or crown of the thread therein.

When the nut is screwed onto the bolt, the tapered end of the latter will engage the end of the leg 9 and, owing to the direction of rotation, will force the inner end of such leg into the position shown in full lines in Fig. 1, such inner end of the leg engaging the crown of the screw thread on the bolt. When it is attempted to unscrew the bolt, the spring will resist such action and, with the arrangement of parts as described, the angle at which such end of the leg engages the bolt thread and the length of such leg will effectively prevent the nut from unscrewing from the bolt, without the employment of notches in the threads of the bolt. The provision of an acute angle between the walls 7 and 8 prevents the leg 10 from yielding by the pressure brought on the end of the leg 9 by the bolt, and all attempts to unscrew the nut are ineffective.

We are aware of the fact that it has been proposed to use springs embedded in nuts to prevent the unscrewing of such nuts from their bolts. In all structures of this type with which we are familiar, the spring has been applied to the outer face of the nut, making it liable to drop out unless some special retaining means be employed. In our construction, however, such special retaining means need not be employed aside from the shape of the recess, and the location of such recess within the inner face of the nut prevents the spring from being displaced or dropping out, as the ordinary washer 11 which is employed with nuts will constitute a bearing for the outer edge of the spring and will effectively retain the same in place and in operative relation to the bolt. Moreover, by locating the recess substantially in a line joining the diagonally opposite corners of a nut, the nut is not weakened, as said recess is placed where the greatest body of the nut is provided, making the strength of this part of the nut, with the recess therein, as great as, or greater than, the strength of said nut at its weakest point, which is along the line joining the middle points of the opposite sides thereof. Furthermore, the direction of the wall 6 and the fact that the spring is so shaped that the normal tendency of the leg 9 is to project in the direction of said wall enables said leg to engage the outer surface of the bolt at the most effective point to prevent backward rotation of the nut.

Owing to the shape of the recess and of the spring, the latter may be applied to the nut by merely dropping or placing it by hand within the recess, the location of the recess within the inner face of the nut retaining the spring therein when the nut has been screwed up into engagement with or adjacent to a washer or other stop. An ordinary nut when provided with a recess such as shown and described herein may thus be readily used either with or without the lock feature, as may be desired.

Having thus described our invention what we claim to be new and desire to secure by Letters Patent is:—

1. A nut having in its inner face an angular recess, said recess merging with the bore of said nut and having three walls, one of said walls extending in the direction of the radius of the bore, another extending at an angle to the first mentioned wall and the third wall forming an acute angle with the second mentioned wall and forming with the first mentioned wall an opening into said bore, and an angular spring freely seated in said recess and having its legs corresponding substantially in direction and extent with the first and second walls prior to the application of the nut to a bolt, substantially as specified.

2. A nut having in its inner face an angular recess, said recess merging with the bore of said nut and having three walls, one of said walls extending in the direction of the radius of the bore, and along the line of a diagonal connecting opposite corners of the nut, another wall extending at an angle to the first mentioned wall and the third wall forming an acute angle with the second mentioned wall and forming with the first mentioned wall a contracted opening into said bore, and an angular spring freely seated in said recess and having its legs, prior to the application of the nut to a bolt, corresponding substantially in direction and extent with the first and second walls, substantially as specified.

In testimony whereof we affix our signatures in the presence of two witnesses.

AUGUST R. KEEHL.
WILLIAM F. KEEHL.

Witnesses:
S. E. FOUTS,
J. B. HULL.